United States Patent

Morimoto et al.

[11] Patent Number: 5,805,361
[45] Date of Patent: Sep. 8, 1998

[54] OPTICAL ELEMENT, OPTICAL ELEMENT MOLDING DIE, AND METHOD OF MOLDING THE OPTICAL ELEMENT

[75] Inventors: Akira Morimoto; Yoshiyuki Shimizu, both of Osaka; Akira Hosomi, Yamagata, all of Japan

[73] Assignee: Matsushita Electric Industrial Co., Ltd., Osaka, Japan

[21] Appl. No.: 679,893

[22] Filed: Jul. 15, 1996

[30] Foreign Application Priority Data

Jul. 18, 1995 [JP] Japan .................................. 7-181436

[51] Int. Cl.⁶ .............................. G02B 7/02; G03B 9/00
[52] U.S. Cl. ................................................. 359/819; 65/47
[58] Field of Search ............................. 359/819; 65/39, 65/44, 47

[56] References Cited

U.S. PATENT DOCUMENTS

| | | | |
|---|---|---|---|
| 4,891,053 | 1/1990 | Bartman et al. | 65/64 |
| 4,895,585 | 1/1990 | Angenent et al. | 65/39 |
| 5,173,100 | 12/1992 | Shigyo et al. | 65/102 |
| 5,185,107 | 2/1993 | Blake | 264/2.5 |
| 5,405,652 | 4/1995 | Kashiwagi et al. | 427/282 |

FOREIGN PATENT DOCUMENTS

| | | |
|---|---|---|
| 60-171232 | 9/1985 | Japan . |
| 61-021927 | 1/1986 | Japan . |
| 61-232249 | 10/1986 | Japan . |
| 61-242921 | 10/1986 | Japan . |
| 1-183612 | 7/1989 | Japan . |
| 06-115955 | 4/1994 | Japan . |
| 6-144849 | 5/1994 | Japan ........................... 65/39 |
| 6-144852 | 5/1994 | Japan ........................... 65/39 |
| 6-166526 | 6/1994 | Japan ........................... 65/39 |
| 1 435 329 | 5/1976 | United Kingdom . |

OTHER PUBLICATIONS

Communication from European Patent Office and attached Search Report, EP 96 11 1479.

*Primary Examiner*—Georgia Y. Epps
*Assistant Examiner*—Ricky Mack
*Attorney, Agent, or Firm*—Merchant, Gould, Smith, Edell, Welter & Schmidt, P.A.

[57] ABSTRACT

In the process of press molding an optical element having an optical functioning face having a grating which is rotationally asymmetric, both ends of an molding face of an lower press die are cut off to form inclined faces. During a press molding, glass material filled in the cuttings presses the inclined faces so that the rotation of a lower press die in an barrel die around an axis is prevented. In addition, the part filled in the cuttings is used as the reference point to mount on an optical apparatus. As a result, the rotation of the press dies is prevented, and the placement of the rotationally asymmetric optical functioning face is avoided. Therefore, the direction for mounting the optical element on an optical apparatus can be easily decided.

28 Claims, 9 Drawing Sheets

OPTICAL ELEMENT, OPTICAL ELEMENT MOLDING DIE, AND METHOD OF MOLDING THE OPTICAL ELEMENT

FIELD OF THE INVENTION

This invention relates to highly precise optical glass elements including lenses and prisms used for optical apparatuses like optical disc devices. This invention specifically relates to optical elements which need a directional property with respect to the optical system, optical element molding dies which are used to mold the optical element by a superprecise glass molding method, and the optical element molding method.

BACKGROUND OF THE INVENTION

Figure 8:
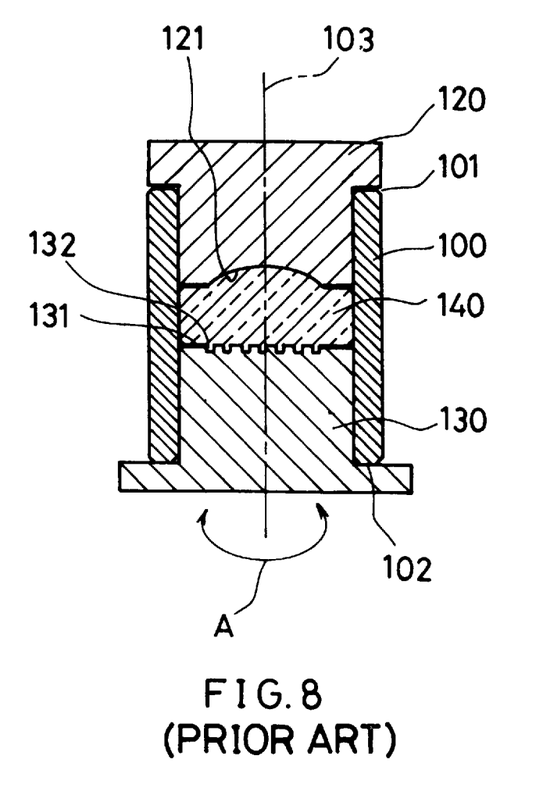
FIG. 8 is a cross-sectional view to show the structure of a conventional optical element molding die.

Published Unexamined Japanese Patent Application Sho. No. 61-21927 discloses a method of manufacturing highly precise optical elements, more specifically, aspherical glass lenses. According to this reference, a glass element is heated to about a temperature where the glass can be deformed (softening point), and then, the glass element is press molded without a polishing process. This method requires highly precious dies. Conventional optical element molding dies and optical element molding apparatus are explained below referring to some drawings. FIG. 8 is a cross-sectional view to show the structure of a conventional optical element molding die, and FIG. 9 is a partial cross-sectional view to show the structure of a general optical element molding apparatus.

The conventional optical element molding die shown in FIG. 8 comprises a substantially cylindrical barrel die 100, an upper press die 120 and a lower press die 130. The upper and lower press dies (120, 130) respectively fit into apertures (101, 102) of the barrel die 100, and can slide in the direction of the axis 103. Glass material 140 is supplied between the upper press die 120 and the lower press die 130. In one embodiment, a concave face 121 is formed on the lower side of the upper press die 120 in order to form an aspherical lens while a rotationally asymmetric face (e.g. grating 132) is formed on the molding face 131 of the upper side of the lower press die 130. The barrel die 100 and the two press dies (120, 130) are not fixed or engaged each other. Thus, the press dies can be rotated around the axis 103 as shown by arrow A.

Figure 9:
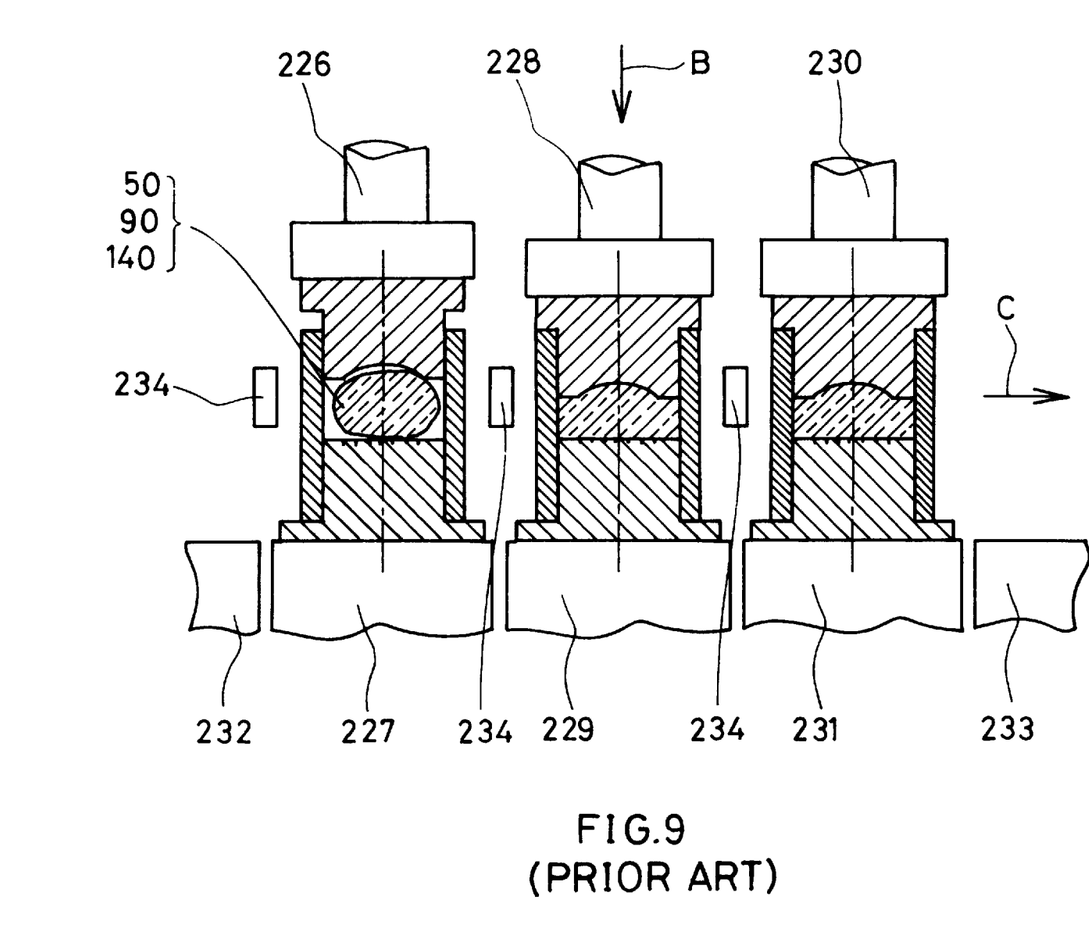
FIG. 9 is a partial cross-sectional view to show the structure of a general optical element molding apparatus.

A general optical element molding apparatus shown in FIG. 9 comprises a molding die inlet 232, a heating stage 227, a pressing stage 229, a cooling stage 231 and a molding die outlet 233, which are arranged in line. A heating head 226, a pressing head 228, a cooling head 230 and transfer arms 234 are also included in the apparatus. The transfer arms 234 are used to transfer the optical element molding die including the conventional dies and dies of this invention to each stage in the direction indicated by arrow C. The optical element molding die provided from the molding die inlet 232 is heated at the heating stage 227 to the temperature where the glass material 140 is transformed (e.g. at about softening point), and then, pressed at the pressing stage 229 in the direction indicated by arrow B. The molding die is cooled at the cooling stage 231 to the softening point of the glass material 140 (or lower than the softening point) and taken out from the molding die outlet 233. As a result, an optical element of a predetermined shape is formed.

Figure 10:
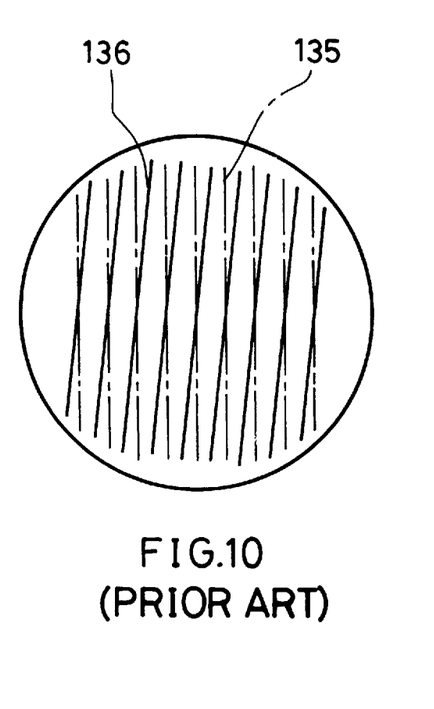
FIG. 10 is a plan view to show an optical element manufactured using a conventional optical element molding die, on which the grating is displaced.

According to the conventional method using the above-mentioned molding die, however, the barrel die 100 and the press dies (120, 130) are not fixed or engaged, thus, the upper press die 120 and the lower press die 130 can rotate around the axis 103. Therefore, the press dies may rotate around the axis 103 when the optical element molding die is transferred from stage to stage by the transfer arm 234. In case the rotated press dies have rotationally-asymmetric faces like the lower press die 130, the optical element transcribing face is displaced before and after the rotationally asymmetric face is transcribed. As shown in FIG. 10, the required grating 135 and the formed grating 136 are displaced with respect to each other. As a result, an optical element with a desired optical element performance is not obtained.

The inner surface of the barrel die 100 and the outer surfaces of the press dies are even circles, thus the outer surface of the optical element formed using this die also becomes an even circle. Therefore, the direction should be marked when such an optical element is mounted on an optical apparatus in some cases, including an optical element having a rotationally asymmetric face should be mounted in a predetermined direction. Marking is also needed if the optical element is a spherical or aspherical lens which is biconcave or biconvex, and the radii of curvature of both faces are similar.

According to a conventional method, position marks are adhered after the optical element is molded in order to mark the mounting direction on the optical element having rotationally asymmetric faces. Otherwise, the mark is painted. In another case, one side of the optical element is cut straight so that the cross section perpendicular to the axis becomes substantially D-shaped (this is called D-cut). Or the optical element is cut so that two parallel straight lines are formed (H-cut). In still another case, the cross section of the molding die is processed to be a square so that the configuration of the optical element can be directly positioned.

According to these conventional methods, the shape of the molding faces are distinguished using microscopes when the mounting direction or marking position of the optical element is decided. Evaluation equipment like laser spot inspecting equipment is also used to distinguish the direction of the optical element depending on the shape of the convergent light beam. The methods are inefficient and the marks cannot be positioned precisely. When a lens is integrated with diffraction elements including gratings, further accuracy is required for mounting around the axis. Therefore, mass-production of the lens is difficult, and it raises the cost. It is still difficult to process the cross section of the barrel die to be square. It is substantially impossible to obtain a precisely processed lens with which diffraction elements including gratings are integrated.

SUMMARY OF THE INVENTION

The first purpose of this invention is to provide an optical element which can be easily mounted on an optical apparatus without marking the mounting direction using an evaluation equipment etc. when the optical element is mounted on the optical apparatus. The second purpose of this invention is to provide an optical element molding die and a method of molding an optical element without displacing the optical element transcribing faces when transferring the molding die. For this purpose, the barrel die and the press dies which are rotationally asymmetric to each other are fixed when the optical element can be still transformed.

In order to achieve these and other objects, the optical element of this invention has at least one optical functioning face. The optical functioning face is provided with reference points to attach to an optical apparatus. The reference points which are concave or convex are provided on the optical functioning face excepting the effective area of the face. Therefore, when the optical element of this invention is mounted on an optical apparatus, the direction can be easily decided even if at least one of the optical functioning faces of the optical element is rotationally asymmetric.

According to this invention, at least one ridge line of the reference point is determined to be parallel to at least one of the main axis or auxiliary axis. The main axis passes through the center of the optical axis of the optical functioning face which is asymmetric to the optical axis, so that the rotationally asymmetric direction of the optical functioning face can be easily distinguished.

If the optical element has two optical functioning faces both of which are spherical or aspherical of biconcave or biconvex shapes having similar radii of curvature, the optical element tends to be mounted with the wrong side up. However, the reference point facilitates the distinction of the optical functioning face and the decision of the mounting direction, so that such a mistake can be avoided.

The mounting reference point is provided between the effective area of the optical functioning face of the optical element and the side of the optical element, so that optical performance of the optical element is not deteriorated. The reference point is made to be an inclined face so that component force perpendicular to the pressing direction is generated from the pressure which is provided to the molding die from the inclined face. Thus, rotation or parallel displacement of the molding die can be avoided during the molding process. This is effective specifically if the face provided with reference point for mounting is rotationally asymmetric. Furthermore, the cross section perpendicular to the optical axis is made to be substantially rectanglar, so that each side of the cross section works as a direction decision means. Similar function can be found if the cross section perpendicular to the optical axis comprises a pair of parallel sides and a pair of circular arc sides facing each other.

In order to provide such an optical element, the optical element molding die of this invention comprises a barrel die having apertures at both ends and a pair of press dies sliding in the barrel die. At least one of the press dies has a molding face which is asymmetric (rotationally asymmetric) to the optical axis of the optical functioning face. The press die having a rotationally asymmetric molding face and the barrel die are engaged in order to prevent the press die having the rotationally asymmetric molding face from rotating around the sliding direction of the axis.

When an optical material such as glass is heated to about the softening point and molded to a predetermined shape by pressing the press dies, the press die having the rotationally asymmetric face is fixed to the barrel die, so the press die does not rotate around the axis. In addition, the barrel die and the press dies are relatively fixed. Therefore, the rotationally asymmetric optical functioning face of the molded optical element is not displaced even if the optical element molding die moves or rotates.

In order to fix the barrel die and the press dies, each of the configurations near the contacting parts of the press dies having rotationally asymmetric molding faces and the barrel die is cut, and the cuttings are engaged with at least one engaging member. Thus, the barrel die and the press dies are easily manufactured. Moreover, a conventional element die is easily remodeled. Otherwise, cutting channels are formed on end faces of the barrel die and on the flange part of the press dies, and the engaging member is made to be a rectanglar key block fitted to the channel. According to this method, well-known milling and commercial components can be used.

In another embodiment, holes are formed in the sliding direction on at least one press die having at least one rotationally asymmetric molding face and a barrel die. The holes are formed near the contacting parts of the press die and of the barrel die. The holes are engaged with at least one engaging member. Thus, a barrel die and a press die are easily manufactured, or a conventional optical element die is easily remodeled. If the metal materials which are used for engagement have a greater coefficient of thermal expansion compared to the materials of the barrel and press dies, the barrel die and the press dies are firmly fixed.

Another optical element molding die of this invention comprises a barrel die having apertures at both ends and a pair of press dies. The press dies are respectively engaged with the apertures of the barrel die and slide in the barrel die. At least one cutting is provided to at least one molding face of the press dies excepting the optical functioning part of the face. Therefore, convexes are formed on the optical component. The convexes can be used to decide the direction and position for mounting the optical element on an optical apparatus.

In another embodiment, at least one cutting is provided to form at least one inclined face of a predetermined angle to the molding face. Thus, the pressure on the inclined face is dispersed in the direction perpendicular to the sliding of the press dies. As a result, it is possible to prevent the die having the cutting from rotating around the axis of the sliding direction. If the molding face formed with the inclined face is rotationally asymmetric, displacement is not found on the rotationally asymmetric optical functioning face of the formed optical element. Furthermore, the ridge line of the inclined face is made to be parallel either to the main axis or the auxiliary axis on the rotationally asymmetric molding face, so that the direction for mounting the optical element on the optical apparatus can be decided referring to the direction of the ridge line on the inclined face.

One of the other embodiments of this invention is an optical element molding die comprising a barrel die with apertures at the both ends, and a pair of press dies. The press dies are respectively engaged with the apertures of the barrel die, and slide in the barrel die. At least one protrusion is formed on at least one of the molding faces of the press dies excepting the optical functioning part, so that at least one concave (against the protrusion) is formed on the optical element. The direction can be decided when the optical element is mounted on the optical apparatus, referring to the concave. This structure is effective, specifically, when the molding face having the protrusion is rotationally asymmetric. The protrusion is made to be parallel to either the main axis or the auxiliary axis on the rotationally asymmetric molding face, so that the angle for mounting the optical element on the optical apparatus is easily decided.

One of the other embodiments of this invention is an optical element molding die comprising a barrel die with apertures at the both ends, and a pair of press dies. The press dies are respectively engaged with the apertures of the barrel die, and slide in the barrel die. The cross sections of the barrel die and the engaging part of the press dies are rectangular perpendicularly to the sliding direction. The press dies cannot rotate respectively around axis of the sliding direction. As a result, displacement is not found even if the optical element has a rotationally asymmetric optical functioning face. In addition, the direction for mounting the optical element on the optical apparatus is easily decided since the cross section of the optical element is also rectangular.

One of the other embodiments of this invention is an optical element molding die comprising a barrel die with apertures at the both ends, and a pair of press dies. The press dies are respectively engaged with the apertures of the barrel die, and slide in the barrel die. Both the barrel die and the parts of the press dies which engage with the barrel die are made to be oval shape. Namely, the cross section perpendicular to the sliding direction of the press dies is composed of a pair of parallel sides and a pair of circular arc sides facing each other. Thus, the press dies cannot rotate relatively to the barrel die around the axis of the sliding direction. Therefore, displacement is not found even if the optical element has a rotationally asymmetric optical functioning face. In addition, the direction for mounting the optical element on the optical apparatus is easily decided since the cross section of the optical element is also oval.

The method of molding the optical element of this invention comprises the following steps:

supplying an optical material between a pair of press dies sliding in a barrel die;

pressing the press dies in the sliding direction while the optical material is heated to about the softening point;

molding the optical material to a predetermined shape; and cooling the optical material while keeping the state. According to this invention, at least one of the press dies is rotationally asymmetric, and the press die having a rotationally asymmetric molding face and the barrel die are engaged with each other in order to prevent the press dies from rotating around the axis of the sliding direction. For this purpose, the press die having the rotationally asymmetric face is fixed to the barrel die in order not to rotate around the axis when the optical material is heated to the softening point and formed to a predetermined shape by pressing the press dies. As a result, the rotationally asymmetric optical functioning face of the optical element has no displacement even if the optical element molding dies move or rotate when the press die is transferred from the pressing to cooling process.

Another method of molding the optical element of this invention comprises the following steps:

supplying an optical material between a pair of press dies sliding in a barrel die;

pressing the press dies in the sliding direction while the optical material is heated to about the softening point;

molding the optical material to a predetermined shape; and cooling the optical material while keeping the state. According to this invention, at least one of the press dies is rotationally asymmetric, and the press die is partially cut excepting the optical functioning part in order to form at least one inclined face having a predetermined angle to the molding face. The optical material is filled in the cutting, and the inclined faces are pressurized via the filled optical material, and as a result, it is possible to prevent the press die having the cutting from rotating around the axis of the sliding direction. Therefore, the pressure on the inclined face is dispersed in the direction perpendicular to the sliding direction, so that the rotation of the press die with the cutting is prevented. In addition, the molding face which is rotationally asymmetric and formed with at least one inclined face has no displacement.

According to this invention, the process of heating the optical material to about the softening point, the process of pressing the press dies, and the cooling process are respectively carried out in different stages, while the optical element molding die comprising the barrel die and the press dies moves between the stages. Therefore, general optical element molding apparatuses can be used without remodeling.

DETAILED DESCRIPTION OF THE INVENTION

First Embodiment

Figure 1:
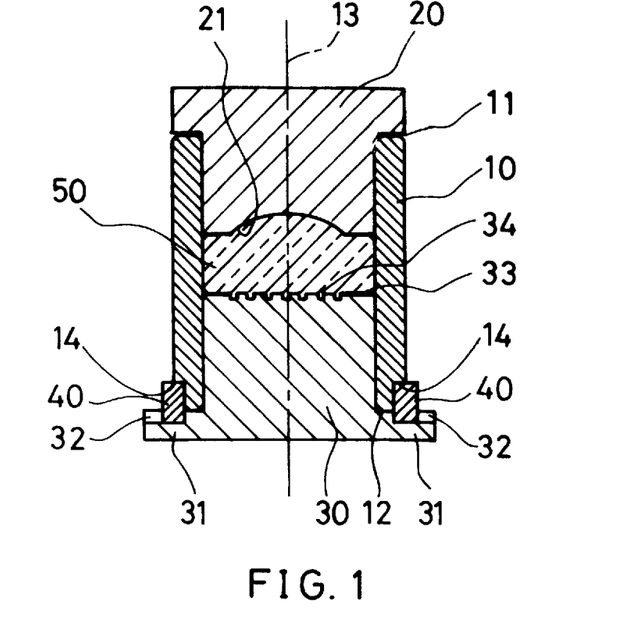
FIG. 1 is a cross-sectional view to show the structure of the first embodiment of the optical element molding die of this invention.
Figure 2:
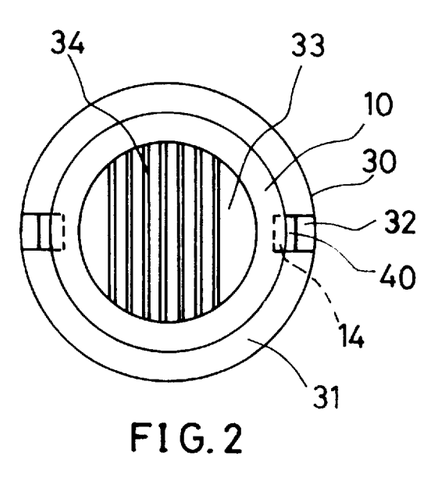
FIG. 2 is a plan view of the optical element molding die of the first embodiment of this invention, without the upper press die.

The first embodiment of the optical element molding die and the method of the same of this invention is explained below referring to some drawings. FIG. 1 is a cross-sectional view to show the structure of the optical element molding die of the first embodiment of this invention, and FIG. 2 is a plan view from which the upper press die is omitted. As shown in FIGS. 1 and 2, the optical element molding die of the first embodiment comprises a substantially cylindrical barrel die 10, an upper press die 20, a lower press die 30, and engaging members 40. The two press dies (20 and 30) respectively fit in the upper aperture 11 and the lower aperture 12 of the barrel die 10. The engaging members 40 engage the barrel die 10 and the lower press die 30 in order not to rotate around the axis 13.

The barrel die 10 is, for example, a hard metal (cemented carbide). Cuttings or channels 14 to engage with the engaging members 40 are formed around the lower aperture 12 of the configuration of the barrel die 10. Both the upper press die 20 and the lower press die 30 are made of hard metal. The lower side of the upper press die 20 is formed to be an aspherical shape whose radius of curvature is 5.0 mm (molding face 21). The upper side (molding face 33) of the lower press die 30 is provided with a grating 34. The cross section of the grating 34 is rectangles of 1 mm wide, 0.5 mm pitch, and 250 nm deep.

The upper press die 20 and the lower press die 30 can slide in the direction of axis 13 in the barrel die 10. In this embodiment, the grating 34 formed on the lower press die 30 is rotationally asymmetric. Therefore, cuttings or channels 32 are also formed on the flange 31 of the lower press die 30 in order to engage with the engaging members 40. Here, the channels 14 of the barrel die 10 and the channels 32 of the lower lower press die 30 are 1.5 mm wide, and 2.0 mm deep. The engaging members 40 are rectangular parallelepiped comprising a metal material having a coefficient of thermal expansion higher than that of the hard metal of the barrel die 10 and of the press dies (20, 30). One example of such a metal is SUS304. Glass material 50 (e.g. SF-8) is supplied between the upper press die 20 and the lower press die 30, similar to conventional techniques.

A method of molding an optical element by using the above-mentioned optical element molding die of the first embodiment is explained below. As shown FIG. 1, glass material 50 is supplied between the upper press die 20 and the lower press die 30. Then, the engaging members 40 are engaged with both the channels 32 of the flange 31 of the lower press die 30 and the channels 14 of the lower end of the barrel die 10. The assembled optical element molding die is supplied from the inlet 232 of the optical element molding apparatus shown in FIG. 9, transferred to the heating stage 227 by the transfer arm 234, where it is heated to the softening point of the glass material 50 (about 505° C.). In the optical element molding die transferred to the heating stage 227, the lower press die 30 and the barrel die 10 are fixed not to rotate around the axis 13. The molding face 33 of the lower press die 30 is formed with grating 34.

After the lower press die 30 and the barrel die 10 are fixed, the optical element molding die is transferred to the pressing stage 229 by the transfer arm 234, where the upper press die 20 is pressed in the direction indicated by the arrow B, and thus the glass material 50 is molded to the predetermined shape. After the molding process, the optical element molding die is transferred to the cooling stage 231 where the optical element molding die and the glass material 50 are cooled. The complete optical element is taken out from the outlet 233. The lower press die 30 formed with the grating 34 does not rotate around the axis 13 when the optical element molding die is transferred to the cooling stage 231, since the lower press die 30 and the barrel die 10 are fixed by the engaging members 40. Therefore, grating displacement as shown in FIG. 10 is not found in the optical element of this embodiment.

When the conventional optical element molding die of FIG. 8 is used, the lower press die 130 and the barrel die 100 may rotate separately due to some factors including impact during the conveyance and friction resistance, since the lower press die 130 and the barrel die 100 are not fixed. The configuration of the optical element transcribed by the barrel die 100 is cooled and solidified earlier, thus the molded optical element also rotates with the barrel die 100. As a result, the optical element may have displaced grating, namely, a preferred optical performance cannot be obtained.

Comparison was made with a conventional optical element formed by using a conventional optical element molding die and that of this embodiment. The transmitted wave front aberration of the conventional optical element was 0.05 λ or more while that of this invention was 0.04 λ or less. The conventional optical element dispersed infinitely because of the grating displacement, and as a result, grating performance was not obtained. On the other hand, the product of this invention without grating displacement provided grating performance. The spectrum ratio of the optical element of this embodiment was as predetermined to be (+1th order diffracted light: 0th order diffracted light : −1th order diffracted light)=1:5:1.

In this embodiment, SF-8 of about 505° C. for softening point was used as the glass material 50. Other glass materials like lanthanum-containing glass material and low-fusion glass material also can be used. Here, hard metal (cemented carbide) was used for the press dies (20, 30), but other material also can be used if they are superior in heat resistance and strength at elevated temperature. In this embodiment, channels having rectangular cross sections were formed on the lower press die 30 and the barrel die 10, and substantially rectangular parallelepiped engaging members 40 were used in order to engage the lower press die 30 and the barrel die 10 with each other. The same effect can be obtained if holes of circular cross sections are formed on the lower press die 30 and on the barrel die 10, and substantially cylindrical engaging members are used. In this embodiment, the lower press die 30 having rotationally asymmetric face and the barrel die 10 were composed to be engaged. It is also possible to form channels on the flange of the upper press die 20 and near the upper end 11 of the barrel die 10, so that both dies are engaged via engaging members 40.

The Second Embodiment

Figure 3:
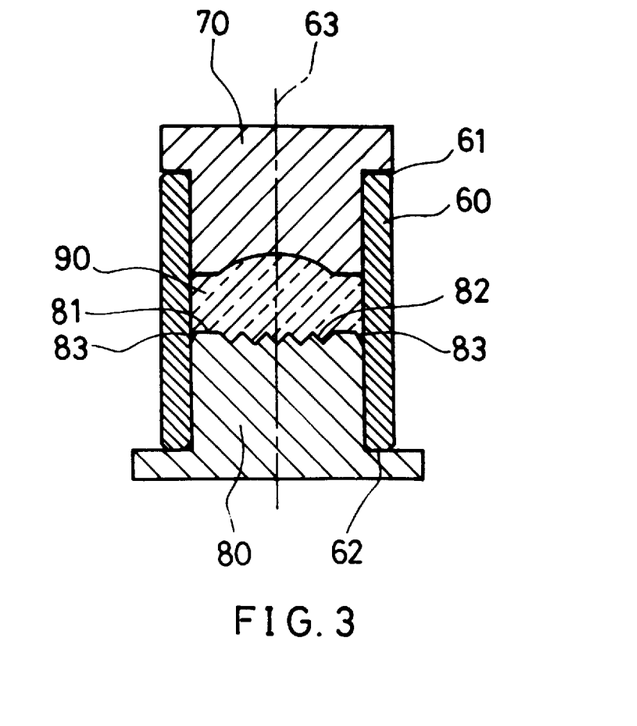
FIG. 3 is a cross-sectional view to show the structure of the second embodiment of the optical element molding die of this invention.
Figure 4:
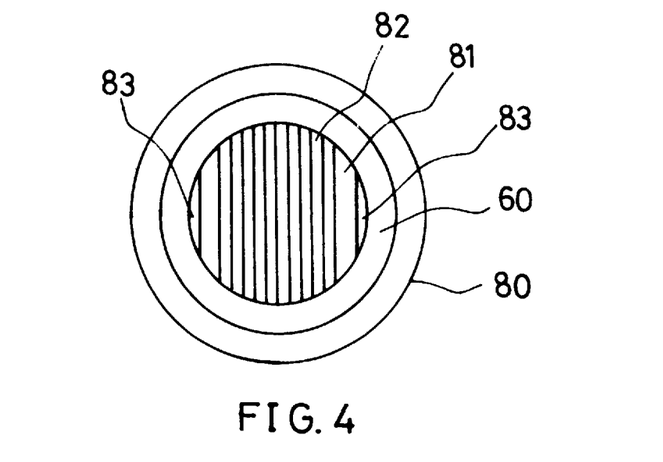
FIG. 4 is a plan view of the optical element molding die of the second embodiment of this invention, without the upper press die.

The second embodiment of the optical element molding die and the method of the same of this invention is explained below referring to some drawings. FIG. 3 is a cross-sectional view to show the structure of the optical element molding die of the second embodiment of this invention, and FIG. 4 is a plan view from which the upper press die is omitted. As shown in FIGS. 3 and 4, the optical element molding die of the second embodiment comprises a substantially cylindrical barrel die 60, an upper press die 70, a lower press die 80. The two press dies respectively fit in the upper aperture 61 and the lower aperture 62 of the barrel die 60. The barrel die 60 and the upper press die 70 are substantially the same as those of the conventional technique shown in FIG. 8. Grating 82 is formed on the upper side (molding face 81) of the lower press die 80. The grating 82 has a cross section of triangular wave shape, and the pitch is 0.2 mm, the depth is 370 nm. Inclined faces 83 are formed at both ends of the molding face 81. The inclined faces 83 are parallel to the grating, and the angle to the molding face is 30°, the depth is 2 mm. The glass material 90 is supplied between the upper press die 70 and the lower press die 80 in the same manner as the first embodiment. For the glass material, BK-7 (the glass transition point is 553° C., and the yield point is 614° C.) is used. In this embodiment, displacement of the grating 82 is prevented by forming the inclined faces 83 on the molding face 81 of the lower press die 80. Unlike the first invention, the barrel die 60 and one of the press dies are not directly fixed.

A method of molding an optical element by using the above-mentioned optical element molding die of the second embodiment is explained below. As shown in FIG. 3, glass material 90 is supplied between the upper press die 70 and the lower press die 80. The assembled optical element molding die is supplied from the inlet 232 of the optical element molding apparatus shown in FIG. 9, transferred to the heating stage 227 by the transfer arm 234, where it is heated to the softening point of the glass material 90 (about 520° C.).

Next, the optical element molding die is transferred to the pressing stage 229 by the transfer arm 234, where the glass material 90 is formed to be the predetermined shape. At the same time, the glass material 90 is filled in the concave near the inclined faces 83 formed on both ends of the molding face 81 of the lower press die 80. The filled glass material 90 pressures the inclined faces 83 which form 30° with the molding face 81 of the lower press die 80. As a result, the lower press die 80 receives not only the vertical pressure created by pressurizing the inclined faces 83, but also a horizontal force component. Therefore, the rotation around the axis 63 is substantially prevented. In addition, the glass material 90 is cooled and shrinks when the optical element molding die is transferred from the pressing stage 229 to the cooling stage 231. Thus, the force that the glass material 90 pressures the inclined faces 83 increases. As a result, the rotational displacement of the glass material 90 and of the lower press die 80 around the axis 63 is prevented. Furthermore, the glass material 90 to which a predetermined configuration is transcribed is not displaced in parallel from the molding face 81.

The grating 82 of the lower press die 80 and the glass material 90 do not rotate or move parallel during the optical element molding die is transferred from the pressing stage 229 to the cooling stage 231 by the transfer arm 234. Therefore, the glass material 90 is pressed and molded while cooled at the cooling stage 231 without any displacement of the grating 82. Later, the optical element molding die and the glass material 90 are gradually cooled to the cooling temperature (about 420° C.) at the cooling stage 231 in order to obtain the desired optical performance. The molded optical element is transferred to the outlet 233 by the transfer arm 234 while gradually cooled in the molding die. As a result, a complete optical element is taken out. The grating 82 of the lower press die 80 and the molded optical element (glass material 90) do not shift until they are separated.

According to the technique using the conventional optical element molding die, the grating may be displaced during the molding process, because the grated lower press die rotates around the axis of the sliding direction of the press dies and of the barrel die. Another reason of the grating displacement is that the transcribed optical element is transferred before the cooling process. However, the optical element molding die of this embodiment prevents the rotation around the axis of the sliding direction. Therefore, the optical element of this embodiment is molded without grating displacement. Conventional optical elements disperse indefinitely due to the displaced gratings, thus grating performance is not obtained. The product of this invention provides an optical element without grating displacement, and the optical element shows grating performance. Namely, a desirable optical element is obtained.

The direction of the grating can be distinguished at once since the direction of the inclined faces 83 transcribed on the optical element is the same as the grating direction. Moreover, the position of the grating can be precisely defined by processing fitting members on the lens barrel side.

An optical element such as the solidified glass material 90 in FIG. 3 is manufactured by the optical element molding method using the optical element molding die of the second invention. It is obvious that the parts (protrusions) filled in the cutting composing the inclined faces 83 work for deciding the direction to mount the optical element on an optical apparatus.

The Third Embodiment

Figure 5:
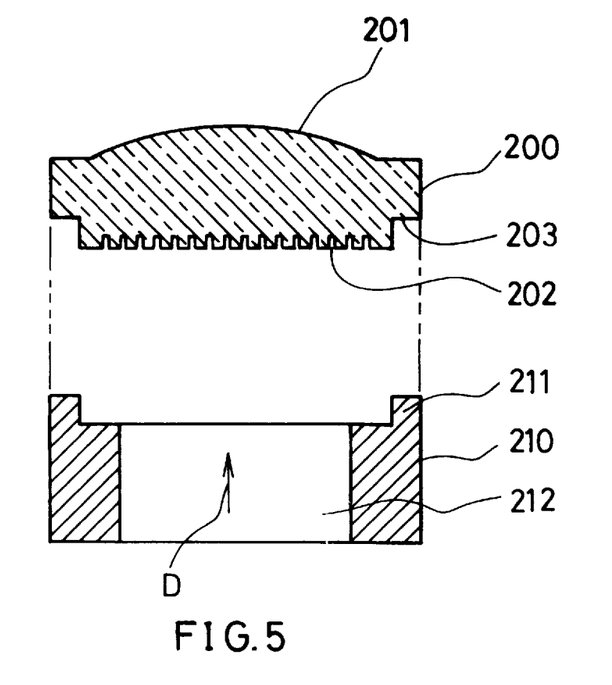
FIG. 5 is a cross-sectional view to show the structure of the third embodiment of this invention.
Figure 6:
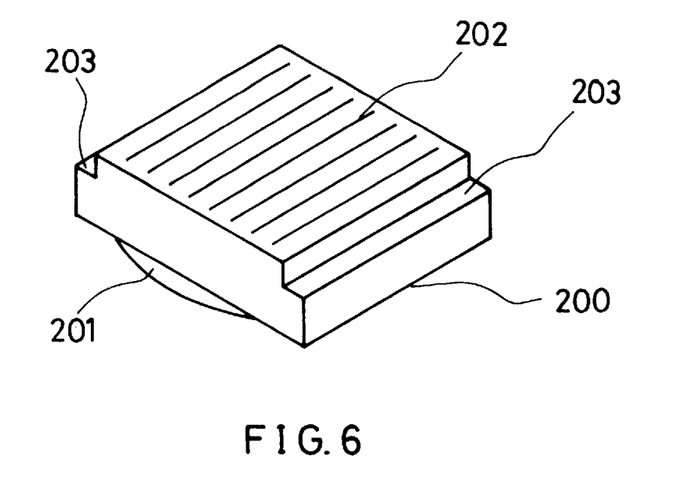
FIG. 6 is a perspective view to show the upper side of a grated molding face of an optical element according to the third embodiment of this invention.

The third embodiment according to the optical element of this invention is explained below referring to some drawings. FIG. 5 is a cross-sectional view to show one embodiment of this invention, namely, an optical element of this invention and an optical apparatus lens barrel suited for the optical element. FIG. 6 is a perspective view of the optical element seen from the grating side. In FIG. 5, a lens functioning face 201 is formed on the optical element 200, and a grating 202 is formed on the lower side of the same optical element 200. The lens functioning face 201 is aspherical, and the radius of curvature is, for example, 150 mm. The cross section of the grating 202 is, for example, rectangles of 0.5 mm wide, 0.8 mm pitch and 200 nm deep. At the ends of the lower side of the optical element 200, cuttings 203 of 1 mm wide, 0.5 mm deep are formed respectively. The cuttings are parallel to the grating 202. SF-6 (the glass transition point is 426° C., and the yield point is 467° C.) is used for the glass material of the optical element 200. The outside diameter of the optical element 200 is about φ 5, and the thickness is 3 mm. The optical apparatus lens barrel is made of metals including brass, and a through hole 212 of φ 3 is formed at its center in order not to cut off the track of the light beam coming from the direction indicated with arrow D. Furthermore, the optical apparatus lens barrel 210 is formed with an convex 211 of 1 mm wide and 0.5 mm high in order to engage with the cuttings 203 formed on the optical element 200.

The optical element of this invention is a lens used for tracking control of an optical disc apparatus. The optical element converts the beam from a semiconductor laser to a parallel light beam, and also generates two auxiliary beams for a main beam. In an optical disc apparatus, the auxiliary beams are shifted in the tracking direction of the optical disc in order to avoid misconception with the pit on the adjacent track when the main beam is focused at a pit on the optical disc. For this purpose, the grating direction should be adjusted when the formed lens is mounted on an optical base.

The optical element is manufactured by using the optical element molding die and the optical element molding method of this invention. For instance, protrusions (not shown) are formed on the molding face of the lower press die having a rotationally asymmetric face in order to form cuttings 203, so that the mounting direction is decided. In this case, the cross section of the part fitting with the barrel die and with the press dies (not shown) is rectanglar in the sliding direction. The cuttings 203 are formed on the optical element 200 to be parallel to the grating 202 (H-cut). Similarly, the optical apparatus lens barrel 210 is provided with a convex 211 to engage with the cuttings 203 on the optical element 200. Therefore, the optical functioning direction of the optical element 200 is easily detected by maintaining the optical element 200 with an adsorption pen (not shown) while rotating the optical element 200 when the optical element 200 is mounted on an optical apparatus. The detection of the optical functioning direction by keeping the optical element 200 with the adsorption pen is difficult in general if the depth of the cuttings 203 on the optical element is 0.5 mm or less.

According to a conventional technique, an optical element is mounted on an optical apparatus after the following steps:

detecting the grating direction by using detecting apparatuses like a microscope and a lens-spot;

checking the direction to mount the optical element on the optical apparatus; and marking the direction on the optical element. Therefore, it takes about one to five minutes to mount an optical element on an optical apparatus. In other words, the yield was very low. On the other hand, the optical element of this invention can be mounted on an optical apparatus only by keeping the optical element with an adsorption pen and rotating it. As a result, it took only about thirty seconds to mount the optical element of this invention on the optical apparatus.

In this embodiment, cuttings 203 are formed on the lower side of the optical element 200 and a convex 211 is formed on the optical apparatus lens barrel 210 in order to decide the direction for mounting the optical element 200. The structure is not limited to this as long as the optical performance of the optical element is not deteriorated and the optical element can be mounted on an optical apparatus precisely. According to another embodiment shown in FIG. 7(a), protrusions 204 having a triangular cross section to decide the position and direction are formed on the molding face formed with a grating 202. The protrusions 204 are formed parallel to the direction of the grating 202 which is a rotationally asymmetric optical functioning face. Channels having triangular cross sections are formed on the molding face of the press die (not shown) of the optical element molding die to mold this optical element, and the direction of the channels are parallel to the grating. The inclined faces of the channels function as the inclined faces 83 of the second embodiment. Therefore, the rotation of the press dies around the axis is prevented, and the grating 202 is not displaced. The protrusions 204 also function as a direction deciding means to mount the optical element 200 on an optical apparatus.

Figure 7A:
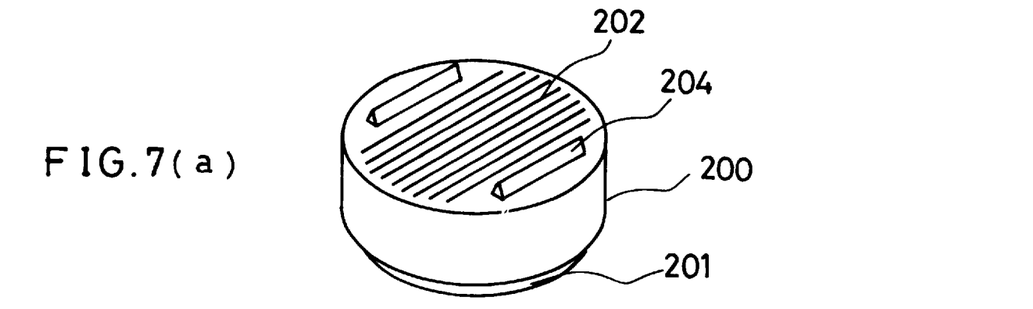
FIGS. 7(a) to 7(h) are perspective views to show other embodiments of this invention.
Figure 7B:
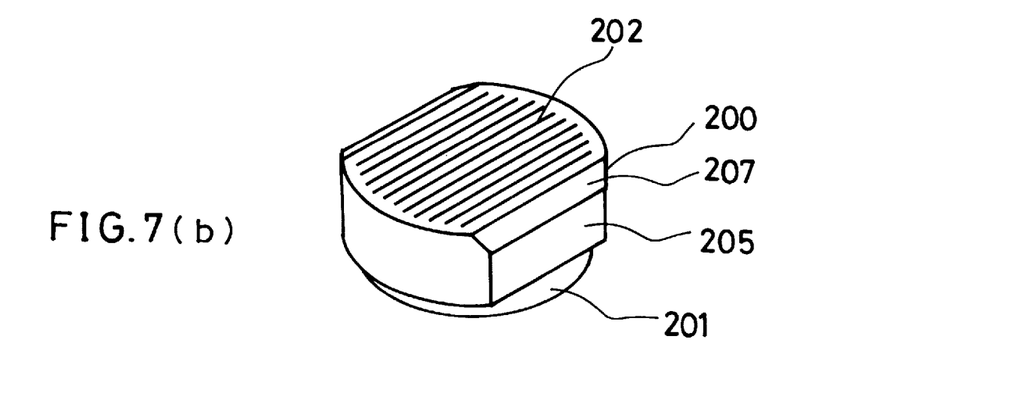

According to still another embodiment shown in FIG. 7(b), flat surfaces 205 are formed on the substantially cylindrical optical element 200 in a direction parallel to the grating 202. The purpose of the flat surface 205 is to decide the mounting direction and to prevent the rotation of the press dies. The cross sections of the barrel die and the parts of the press dies (not shown) which are engaged with the barrel dies are oval shape which has a pair of parallel facing sides and a pair of facing circular arc sides. In this case, the barrel die and the press dies engage each other via the flat surfaces, and thus the press dies do not rotate around the optical axis. The flat surfaces 205 also function as a direction decision means for mounting the optical element 200 on an optical apparatus.

Figure 7C:
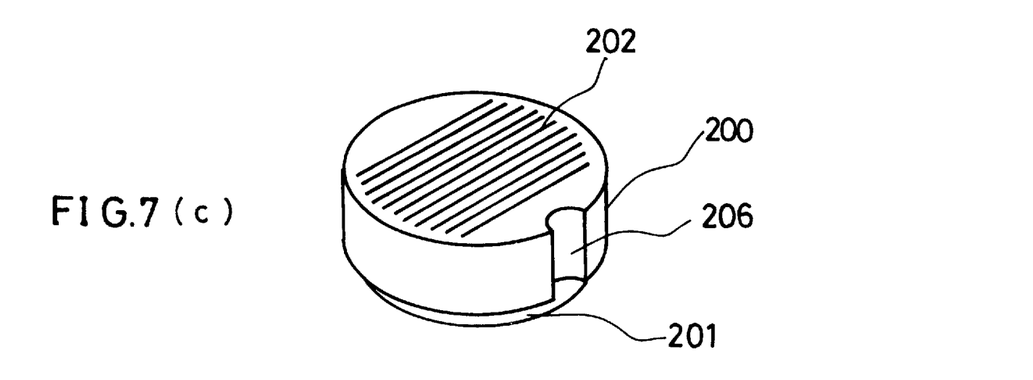
Figure 7D:
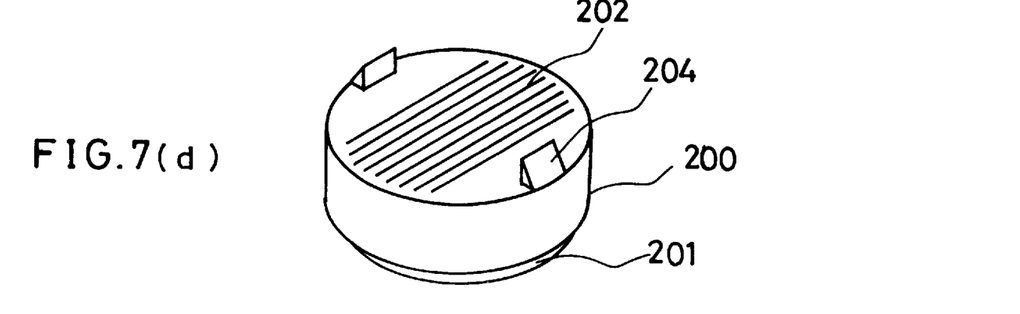
Figure 7E:
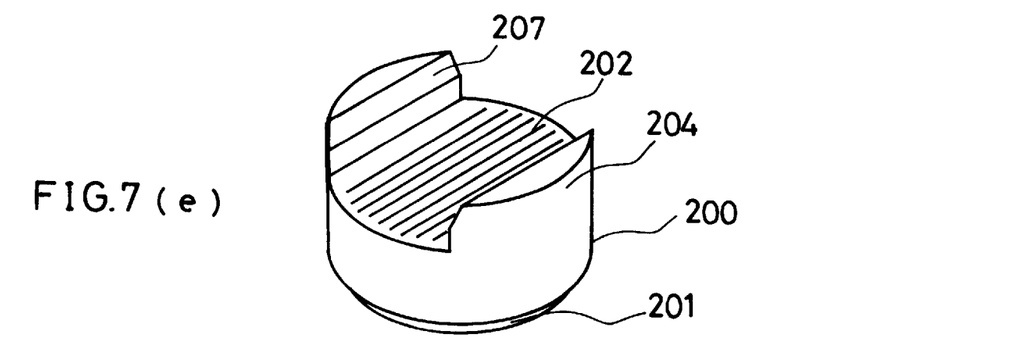
Figure 7F:
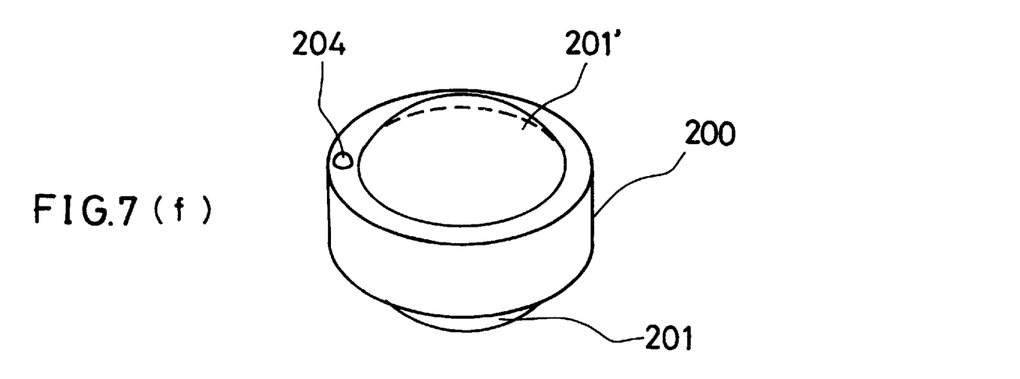
Figure 7G:
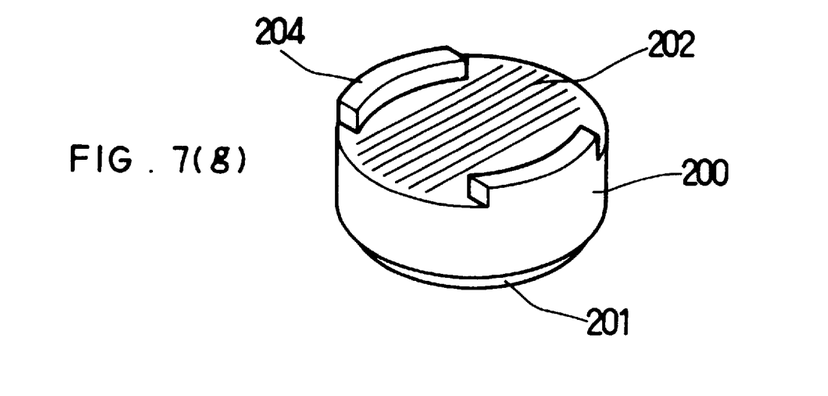
Figure 7H:
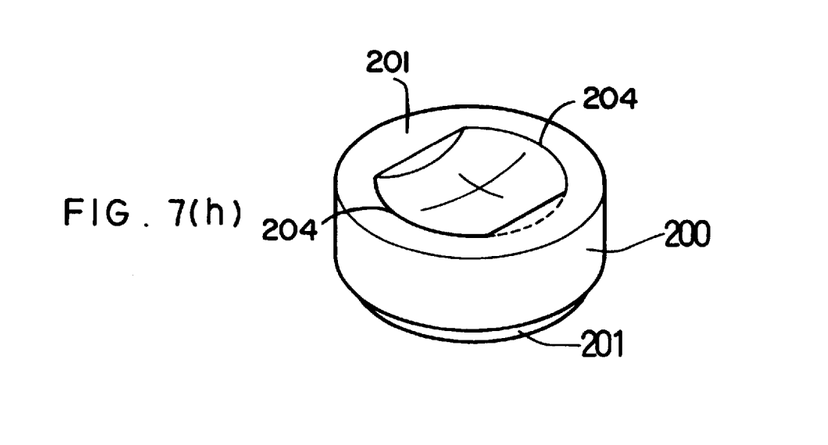
Figure 7I:
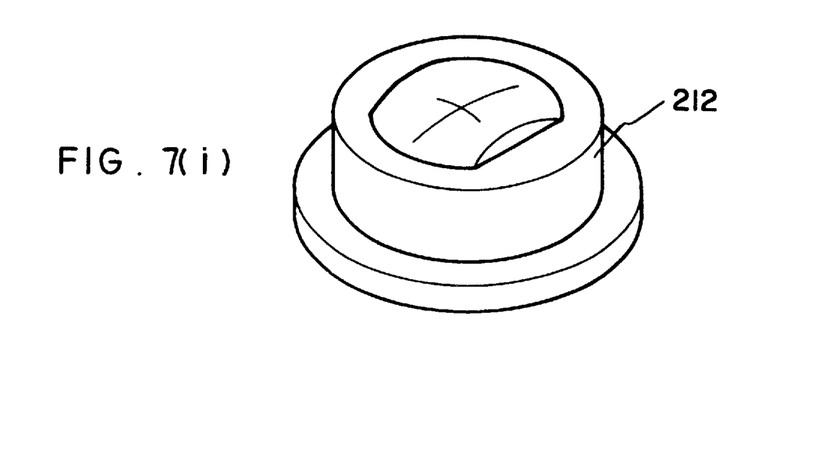
FIG. 7(i) illustrates a die used to form the lens of FIG. 7(h)

Different lenses 200 having a pair of parallel sides and a pair of circular sides 204 facing each other are illustrated in FIGS. 7(g) and 7(h). FIG. 7(i) illustrates a die 212 used to form the upper surface 210 of the lens 200 illustrated in FIG. 7(h).

FIG. 7(c) shows another embodiment in which a cutting 206 has a substantially circular cross section near the outer circumference of the substantially cylindrical optical element 200. The circular cross section functions for a decision of mounting direction and prevention of the rotation of the press dies. The barrel die (not shown) of the optical element molding die for molding the optical element is, for example, substantially cylindrical, and a protrusion is formed on the inner circumference of the cylindrical face. The protrusion is semicylindrical and opposite to the cutting 206. The cylindrical outer circumferences of the press dies which are engaged with the barrel die are also cut in the same manner as the optical element. Rotation of the press dies is prevented by the fitting of the cutting and of the protrusion. In addition, the cutting 206 of the molded optical element 200 functions to decide the direction for mounting the optical element 200 on an optical apparatus.

FIG. 7(d) shows an embodiment in which protrusions 204 having a triangular cross section are formed on the molding face having the grating 202 as shown in FIG. 7(a) in order to decide the position and the direction. The protrusions 204 are formed in parallel to the direction of the grating 202 which is a rotationally asymmetric optical functioning face. FIG. 7(e) shows a reverse example of FIG. 7(b), in which protrusions 204 and inclined faces 207 are formed on the outer circumference of the substantially cylindrical optical element 200 in the direction parallel to the grating 202 in order to decide the mounting direction and to prevent the rotation of the press dies. FIG. 7(f) shows an example in which a protrusion 204 is formed to decide the direction for mounting the optical element having spherical or aspherical faces 201 and 201' of similar radiuses of curvature.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. An optical element having at least one optical functioning face, whereon at least one reference point for mounting on an optical apparatus is formed outside an effective area of said optical functioning face, the shape of the reference point is selected from the group consisting of convex and concave, and the reference point is engageable to prevent rotation of the element relative to a forming die.

2. The optical element according to claim 1, wherein said at least one optical functioning face is asymmetric to the optical axis.

3. The optical element according to claim 2, wherein at least one ridge line of said reference point is parallel to at least one of the axes selected from the group consisting of the main axis and the auxiliary axis, and the axes pass through the optical axis of the optical functioning face asymmetric to said optical axis.

4. The optical element according to claim 1, wherein said optical functioning face comprises two faces, both of which are spherical or aspherical biconvexes or biconcaves having similar radii of curvature.

5. The optical element according to claim 1, wherein said reference point is formed between the effective area of the optical functioning face and the side part of said optical element.

6. The optical element according to claim 5, wherein said reference point includes at least one inclined face.

7. The optical element according to claim 1, wherein a cross section substantially perpendicular to the optical axis is substantially rectangular.

8. The optical element according to claim 1, wherein a cross section which is substantially perpendicular to the optical axis comprises a pair of parallel sides and a pair of circular arc sides facing each other.

9. An optical element molding die comprising a barrel die having apertures at both ends, a pair of press dies which fit respectively in the apertures of said barrel die and slide in the barrel die, where at least one of the press dies has a molding face rotationally asymmetric to the optical axis of the optical functioning face, and said press die having the rotationally asymmetric molding face being in non-rotatable engagement with said barrel die to prevent the press die from rotating around the axis of the sliding direction.

10. The optical element molding die according to claim 9, wherein cuttings are formed on the circumference of the press die having rotationally asymmetric molding face and of the barrel die around the contacting part of said press die and said barrel die, and at least one engaging member is engaged in said cuttings.

11. The optical element molding die according to claim 10, wherein cutting channels are formed partially on the flange of said press die and on the end face of said barrel die, and said engaging member is a nearly rectangular parallelepiped key block fitted to said channels.

12. The optical element molding die according to claim 9, wherein holes of sliding direction are formed near the contacting part of said press die having rotationally asymmetric molding face and said barrel die, and an engaging member is engaged with said holes.

13. The optical element molding die according to claim 10, wherein a metal material having a coefficient of thermal expansion greater than coefficients of thermal expansion of materials forming said press dies and of said barrel die is used for said engaging member.

14. An optical element molding die comprising a barrel die having apertures at both ends, a pair of press dies which fit respectively in the apertures of said barrel die and slide in the barrel die, wherein at least one cutting is formed on at least one molding face of said press dies outside an area corresponding to an effective optical functioning face.

15. The optical element molding die according to claim 14, wherein said cutting is provided to form an inclined face of a predetermined angle to said molding face, so that said optical element filled in said cutting presses said inclined face in order to prevent the press die having said cutting from rotating in said sliding direction when the optical material supplied between said a pair of press dies is pressured.

16. The optical element molding die according to claim 15, wherein said molding face on which said at least one inclined face is formed is rotationally asymmetric.

17. The optical element molding die according to claim 16, wherein the ridge line of said inclined face is parallel to at least one axis selected from the group consisting of the main axis and the auxiliary axis of the rotationally asymmetric molding face.

18. An optical element molding die comprising a barrel die having apertures at both ends, a pair of press dies which fit respectively to the apertures of said barrel die and slide in the barrel die, wherein at least one protrusion is formed on at least one molding face of said press dies outside an area corresponding to an effective area of an optical functioning face of a molded optical element.

19. The optical element molding die according to claim 18, wherein the molding face provided with said protrusion is rotationally asymmetric.

20. The optical element molding die according to claim 19, wherein said protrusion is parallel to at least one axis selected from the group consisting of the main axis and the auxiliary axis.

21. An optical element molding die comprising a barrel die having apertures at both ends, a pair of press dies which fit respectively in the apertures of said barrel die and slide in the barrel die, wherein said barrel die and the part of said press dies fitted to said barrel have rectangular cross sections perpendicular to the sliding direction of said press dies.

22. An optical element molding die comprising a barrel die having apertures at both ends, a pair of press dies which fit respectively in the apertures of said barrel die and slide in the barrel die, wherein the cross sections of said barrel die and the part fitted to said barrel die are perpendicular to the sliding direction of said press dies, and the cross sections comprise a pair of parallel sides and a pair of circular arc sides facing each other.

23. A method of molding an optical element and the method comprises the steps:

supplying an optical material between a pair of press dies sliding in a barrel die;

pressing said press dies in said sliding direction while said optical material is heated to about its softening point;

molding said optical material to a predetermined shape and cooling the material while keeping the state, where at least one of the molding faces of said press dies is rotationally asymmetric; and engaging the at least one press die provided with a rotationally asymmetric molding face and the barrel die to prevent the at least one press die and the barrel die from rotating around an axis parallel to said sliding direction.

24. A method of molding an optical element according to claim 23, comprising a step of heating said optical material to about its softening point, a step of pressing said press dies, and a step of cooling said press dies, and those steps are conducted in different stages, and an optical element molding die comprising said barrel die and said a pair of press dies is transferred between said stages.

25. A method of molding an optical element comprising the steps:

supplying an optical material between a pair of press dies sliding in an barrel die;

pressing said press dies in said sliding direction while said optical material is heated to about its softening point;

molding said optical material to be a predetermined shape and cooling the material while keeping the state, where at least one molding face of said press dies is rotationally asymmetric, and providing at least one cutting on said rotationally asymmetric molding face of said press die excepting an optical functioning face of said molding face in order to form at least one inclined face of a predetermined angle to said molding face;

filling said optical material in said cutting;

pressing said inclined face via said filled optical material in order to prevent said press die having said cutting from rotating around an axis in the sliding direction.

26. A method of molding an optical element according to claim 25, comprising a step of heating said optical material to about its softening point, a step of pressing said press dies, and a step of cooling said press dies, and those steps are conducted in different stages, and an optical element molding die comprising said barrel die and said a pair of press dies is transferred between said stages.

27. An optical element molding die comprising a barrel die having apertures at both ends, a pair of press dies which fit respectively to the apertures of said barrel die and slide in the barrel die, wherein at least one protrusion is formed on at least one molding face of said press dies excepting the optical functioning face, wherein the molding face provided with said protrusion is rotationally asymmetric.

28. An optical element molding die comprising a barrel die having apertures it both ends, a pair of press dies which fit respectively to the apertures of said barrel die and slide in the barrel die, wherein at least one protrusion is formed on at least one molding face of said press dies excepting the optical functioning face, wherein said protrusion is parallel to at least one axis selected from the group consisting of the main axis and the auxiliary axis.

* * * * *